July 8, 1958 G. L. CLAPPER 2,842,683
PULSE GENERATING CIRCUIT
Filed Sept. 4, 1956
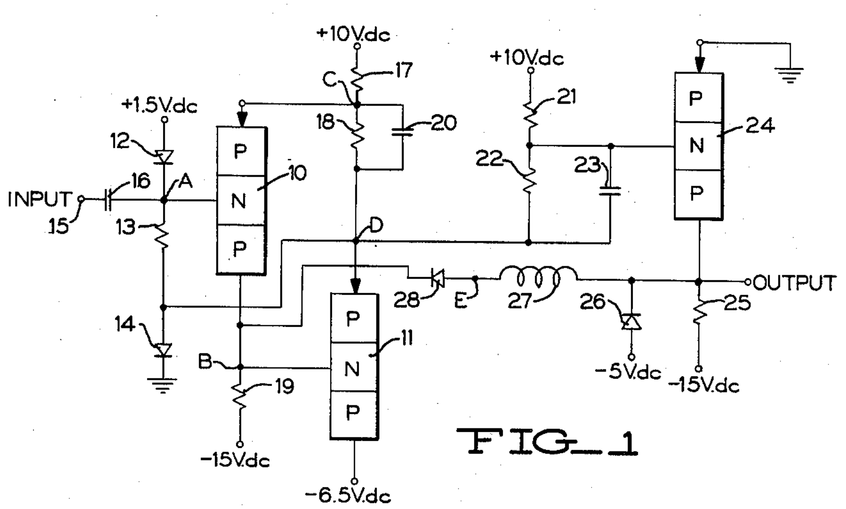
FIG_1
FIG_3
| L | T |
|---|---|
| .5MH | .5μS |
| 1MH | .75μS |
| 2.5MH | 1.5μS |
| 5MH | 2μS |
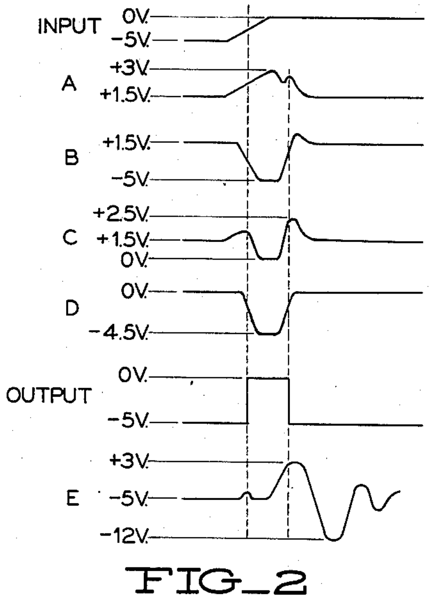
FIG_2
INVENTOR.
GENUNG L. CLAPPER
BY Dewey J. Cunningham
ATTORNEY United States Patent Office 2,842,683
Patented July 8, 1958

2,842,683

PULSE GENERATING CIRCUIT

Genung L. Clapper, Vestal, N. Y., assignor to International Business Machines Corporation, New York, N. Y., a corporation of New York Application September 4, 1956, Serial No. 607,701

3 Claims. (Cl. 307—88.5)

This invention relates to signal translating apparatus, and particularly to an arrangement for generating pulses.

An object of the present invention is to provide a new and improved circuit employing transistors to generate pulses which are substantially independent of the input waveform.

Another object of the invention is to provide a new and improved pulse generator capable of generating pulses whose duration may vary over a relatively wide range.

Still another object of this invention is to furnish a new and improved pulse generating apparatus employing transistors for generating short substantially square wave pulses capable of being used for driving purposes.

A further object of the present invention is to produce a new and improved pulse shaping circuit.

Briefly, the present invention comprises a bistable device including two transistors, one of said transistors being connected in a modified grounded base configuration. In the embodiment illustrated, PNP junction type transistors are utilized. An input circuit is provided such that the voltage swing at the base of the said one transistor is limited in one direction. The emitter of said one transistor is connected to a point on a voltage divider which is connected between a positive source of D. C. potential and the emitter of the other transistor. The collector of this said one transistor is connected directly to the base of the said other transistor and by way of a resistor to a negative source of D. C. potential. The emitter of the said other transistor is connected back to the emitter of the said one transistor by the voltage divider previously mentioned and by way of the input circuit of the said one transistor to the base thereof. The collector of said other transistor is connected to a negative source of D. C. potential. The arrangement is such that the bistable device is considered to be off when the said one transistor is conducting and the said other transistor is not conducting. As soon as the input signal changes the voltage at the base of the said one transistor sufficiently to cause it to go out of conduction, the collector thereof supplies a voltage to the base of the said other transistor sufficient to cause it to go into conduction. When the said other transistor goes into conduction, it supplies a feedback signal to the emitter of the said one transistor by way of the voltage divider and to the base of the said one transistor by way of the input circuit to the said one transistor. The arrangement is such that the first feedback path tends to maintain the said one transistor out of conduction while the second feedback path returns the input circuit of the said one transistor to a point where it will be receptive to subsequent input pulses. The output of the trigger is taken from the emitter from the said other transistor and supplied to the base of a third transistor which is connected in a grounded emitter configuration. In this arrangement, the third transistor serves as an inverter. The output from the third transistor is supplied by way of a delay device and a unidirectional conducting device to the base of the said other transistor. The arrangement is such that the size of the time delay in the delay device determines when the trigger will be turned off. By varying the time delay, it has been found possible to reliably produce substantially square wave pulses having a time duration of from 0.3 microsecond to 3 microseconds, the output pulses being substantially independent of the waveshape of the input signal.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a schematic diagram of an illustrative embodiment of the present invention;

Fig. 2 shows a plurality of waveforms which may be produced in the circuit shown in Fig. 1 at the points indicated; and Fig. 3 shows a table for various values of inductance in the delay device shown in Fig. 1 and the time duration of the pulses produced from this circuit for the particular values.

Referring to Fig. 1, there is provided two PNP junction type transistors 10 and 11. The convention used in illustrating the various electrodes of the transistors is that the emitter electrode is shown as an arrow pointing into the upper P-type region of the transistor. The collector electrode is connected to the lower P-type region and the base electrode is connected to the N-type region. Transistor 10 is connected in a modified grounded base configuration. The base of the transistor is connected to the cathode of a diode 12 whose plate is connected to a positive source of D. C. potential. The base is also connected by way of a resistor 13 to the emitter of transistor 11 and to the plate of a diode 14 whose cathode is connected to ground. It will be seen, therefore, that the voltage at the base of transistor 10 is not allowed to go substantially below +1.5 volts to which the plate of diode 12 is connected and that the emitter of transistor 11 cannot go substantially above ground. The emitter of transistor 10 is connected to a point intermediate resistors 17 and 18 which form a voltage divider between the positive source of D. C. potential and the emitter of transistor 11. The collector of transistor 10 is connected directly to the base of transistor 11 and by way of a resistor 19 to a negative source of D. C. potential.

The operation of the circuit described to this point may be understood by reference to Fig. 2 which shows a plurality of sample waveforms for different points in the circuit shown in Fig. 1. The input signal, which is supplied to terminal 15, is coupled by way of capacitor 16 to the base of transistor 10. As shown in Fig. 2, the input signal may be a voltage which rises rather gradually from −5 volts toward ground. As previously mentioned, the base of transistor 10 is not allowed to go below +1.5 volts by reason of the diode 12. However, as soon as the voltage input at terminal 15 begins to rise, the voltage at the base of transistor 10 also begins to rise. At a particular point as shown by the first dotted line in Fig. 2, the voltage of the base of transistor 10 is sufficiently positive to cause the transistor to go out of conduction. As this occurs, the collector of transistor 10 drops sufficiently to cause transistor 11 to go into conduction and produce a drop in potential at the emitter of transistor 10 to maintain it nonconducting. This drop in potential is due to the fact that when transistor 11 goes into conduction its emitter voltage drops and lowers the voltage at the midpoint of the divider comprising resistors 17 and 18. A high frequency by-pass capacitor 20 is provided in parallel with the resistor 18 and results in speeding the drop at the emitter of transistor 11.

The emitter of transistor 11 is connected to a point intermediate resistor 13 and diode 14 in the input circuit to transistor 10. Diode 14 serves to prevent the emitter of transistor 11 from going above ground. However, as the emitter voltage of transistor 11 drops below ground, due to the fact that the transistor goes into conduction, a lower voltage is applied to the lower end of resistor 13, thereby aiding in the discharge of capacitor 16. The discharge of capacitor 16 results in a lowering of the voltage at point A as shown in Fig. 2. This, of course, tends to bias transistor 10 such that it will be free to go into conduction as soon as the emitter voltage thereof rises sufficiently to forward bias the emitter to base connection.

The output voltage from the emitter of transistor 11 is shown at D in Fig. 2. This voltage drops from ground to approximately −4.5 volts. This drop is sufficiently sharp to produce the necessary action in the circuit now to be described. There is provided a voltage divider comprising resistors 21 and 22, the upper end of resistor 21 being connected to a positive source of D. C. potential and the lower end of resistor 22 being connected to the emitter of transistor 11. The output from a point intermediate the resistors 21 and 22 is connected to the base of a PNP junction type transistor 24 which is connected in a grounded emitter configuration. A high frequency by-pass capacitor 23 is arranged in parallel with resistor 22 so as to speed up the change in potential at the base of transistor 24. The collector of transistor 24 is connected by way of resistor 25 to a negative source of D. C. potential. In this arrangement, transistor 24 serves as an inverter.

When the voltage at the emitter of transistor 11 drops towards −4.5 volts, transistor 24 is allowed to go into conduction and causes a rise in potential at the collector thereof. This rise is relatively sharp as seen in the waveform labeled Output in Fig. 2. There is provided a diode 26 whose cathode is connected to the collector of transistor 24 and whose plate is connected to a negative source of D. C. potential which is somewhat more positive than the negative source of D. C. potential connected to the lower end of resistor 25. This diode prevents the collector of transistor 24 from going below the potential connected to the plate of the diode. The collector of transistor 24 is connected to one end of an inductance element 27, the other end of said element being connected to the plate of a diode 28 whose cathode is connected to the base of transistor 11. While an inductance element 27 has been shown in the illustrative embodiment, it will be appreciated that other types of delay devices may be used.

As the voltage at the collector of transistor 24 rises, the output at the side of the inductance element 27 connected to the plate of diode 28 does not immediately rise. However, after a predetermined time, which time is determined by the value of inductance element 27, the voltage at the plate of diode 28 begins to rise and produces a positive going voltage at the base of transistor 11 sufficient to cause transistor 11 to go out of conduction. As transistor 11 goes out of conduction, the emitter voltage rises to ground and results in a rise in voltage at the emitter of transistor 10. Since the base of transistor 10 has already been allowed to drop to the +1.5 volts connected to the plate of diode 12, transistor 10 will go into conduction very quickly. The turning on of transistor 10 results in a continued bias to the base of transistor 11 and thereby keeps transistor 11 out of conduction.

As shown in Fig. 3, a considerable range of values of inductance may be used to produce various widths of output pulses. For example, where a 0.5 millihenry inductance element is used, an output pulse having a width of 0.5 microsecond may be produced. On the other hand, where a 5 millihenry inductance element is used, an output pulse having a width of two microseconds may be produced.

From the above detailed description, it will be appreciated that I have provided a novel pulse generator or pulse shaper arrangement in which substantially square wave output pulses of variable time duration may be produced which are substantially independent of the waveshape of the input signals.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A signal translating apparatus comprising a bistable device having a pair of transistors of the same conductivity type and each having a base, an emitter and a collector, first means connecting the emitters of said transistors to a first potential, second means connecting the collector of one of the transistors and the base of the other transistor to a second potential, the collector of said other transistor being connected to a potential different from said first potential, input circuit means connected to the base of said one transistor for changing the conductive state thereof in response to an input signal, the change in conductive state of said one transistor causing a change in the conductive state of said other transistor by way of said second means, said other transistor biasing said one transistor by way of said first means to remain in the conductive state to which it was changed by said input signal, means connected to the emitter of said other transistor for inverting the voltage appearing at said emitter, and a delay device connected to receive the output of the last-named means and to supply a signal after a prescribed interval to the base of said other transistor for changing said other transistor back to the conductive state it was in prior to the change of state thereof.

2. A signal translating apparatus comprising a bistable device having a pair of transistors of the same conductivity type and each having a base, an emitter and a collector, first means connecting the emitters of said transistors to a first potential, second means connecting the collector of one of the transistors and the base of the other transistor to a second potential, the collector of said transistor being connected to a potential different from said first potential, input circuit means connected to the base of said one transistor for changing the conductive state thereof in response to an input signal, the change in conductive state in said one transistor causing a change in the conductive state of said other transistor by way of said second means, said other transistor biasing said one transistor by way of said first means to remain in the conductive state to which it was changed by said input signal, a third transistor connected to receive the output of said other transistor at the emitter hereof for inverting the voltage appearing at said emitter, and a delay device connected to receive the output of the said third transistor for supplying an input to the base of said other transistor for changing said other transistor back to the conductive state it was in prior to the change of state of said other transistor.

3. A signal translating apparatus comprising a bistable device having a pair of transistors of the same conductivity type and each having a base, an emitter and a collector, first means connecting the emitters of said transistors to a first potential, second means connecting the collector of one of the transistors and the base of the other transistor to a second potential, the collector of said other transistor being connected to a potential different from said first potential, input circuit means connected to the base of said one transistor for changing the conductive state thereof in response to an input signal, the change in conductive state of said one transistor causing a change in the conductive state of said other transistor by way of said second means, said other transistor biasing said one transistor by way of said first means to remain in the conductive state to which it was changed by said input signal, a third transistor having a base, an emitter and a collector, the base of said third transistor being connected to the emitter of said other transistor, means connecting the emitter of said third transistor to a fixed potential, the collector of said third transistor being connected to an output terminal and by way of an impedance to a source of potential different from said fixed potential, means including a delay device and a unidirectional conducting device connecting the collector of said third transistor to the base of said other transistor, said delay device supplying a change in voltage to the base of said other transistor by way of said unidirectional conducting device a predetermined time interval following a change in voltage at the collector of said third transistor, the last-mentioned change in voltage at the base of said other transistor causing said other transistor to change its conductive state and in turn, by way of said first means, change the conductive state of said one transistor.

References Cited in the file of this patent

UNITED STATES PATENTS 2,569,345 Shea ------------------ Sept. 25, 1951